(12) United States Patent
Satran et al.

(10) Patent No.: US 8,177,460 B2
(45) Date of Patent: May 15, 2012

(54) CUTTING INSERT

(75) Inventors: Amir Satran, Kfar Vradim (IL); Yuri Men, Haifa (IL); Alexander Passov, Haifa (IL)

(73) Assignee: Iscar, Ltd., Tefen (IL)

( * ) Notice: Subject to any disclaimer, the term of this patent is extended or adjusted under 35 U.S.C. 154(b) by 488 days.

(21) Appl. No.: 12/594,161

(22) PCT Filed: Mar. 17, 2008

(86) PCT No.: PCT/IL2008/000371
§ 371 (c)(1),
(2), (4) Date: Sep. 30, 2009

(87) PCT Pub. No.: WO2008/120186
PCT Pub. Date: Oct. 9, 2008

(65) Prior Publication Data
US 2010/0080662 A1    Apr. 1, 2010

(30) Foreign Application Priority Data
Apr. 1, 2007 (IL) .......................................... 182343

(51) Int. Cl.
B23C 5/16 (2006.01)
B23C 5/00 (2006.01)

(52) U.S. Cl. .......................................... 407/113; 407/66

(58) Field of Classification Search .................. 407/113, 407/114, 115, 116, 117, 40, 66, 67
See application file for complete search history.

(56) References Cited

U.S. PATENT DOCUMENTS

| 3,289,271 | A | * | 12/1966 | Stier | 407/113 |
|---|---|---|---|---|---|
| 3,541,655 | A | | 11/1970 | Stier | |
| 4,475,851 | A | * | 10/1984 | Hale | 407/113 |
| 5,382,118 | A | * | 1/1995 | Satran et al. | 407/42 |
| 5,951,214 | A | * | 9/1999 | Rothballer et al. | 407/42 |
| 5,957,629 | A | * | 9/1999 | Hessman et al. | 407/113 |
| 2002/0054210 | A1 | | 5/2002 | Glier et al. | |

FOREIGN PATENT DOCUMENTS
FR          1 399 654          5/1965

OTHER PUBLICATIONS

International Search Report in PCT/IL2008/000371, dated Aug. 27, 2008.
Written Opinion in PCT/IL2008/000371, dated Aug. 27, 2008.
International Preliminary Report on Patentability in PCT/IL2008/000371, dated Apr. 2, 2009.
Israeli Office Action, dated May 30, 2010.

* cited by examiner

Primary Examiner — Will Fridie, Jr.
(74) Attorney, Agent, or Firm — Womble Carlyle

(57) ABSTRACT

A cutting insert has a trigonal shape. The cutting insert has a peripheral surface that extends between two opposing identical end surfaces. A median plane (M) bisects the cutting insert between the end surfaces. A through bore extends between the end surfaces. A cutting edge, formed at the intersection of each end surface with the peripheral surface, is divided into three identical cutting sections. Each cutting section is located between two vertexes of the trigonal shape. Each cutting section has a convex primary cutting edge and a concave secondary cutting edge that merge together. An insert tangential abutment surface is located between the cutting edge and the through bore. A primary relief surface forms an insert internal obtuse angle with a first reference plane (P1). A secondary relief surface forms an insert internal acute angle with a second reference plane (P2).

12 Claims, 7 Drawing Sheets

CUTTING INSERT

FIELD OF THE INVENTION

The present invention relates to cutting inserts for high speed milling combined with ramp down operations.

BACKGROUND OF THE INVENTION

A milling technique known as high feed milling or HFM is characterized by a low engagement into a workpiece, in axial direction relative to a tool axis, and a high feed rate. The high speed milling machining method is widespread in industry. There are many cutting geometries which allow realizing this technique. Some geometries can be observed on solid tools and replaceable solid heads and others have been realized with different cutters having indexable cutting inserts mounted therein.

Ramping or a ramp down milling is known as a milling process with a lateral feed combining an axial feed. Due to the ability to achieve high metal removal rate in rough milling with relatively light machine tools the mentioned technique is very popular in the die and mold industry. Machining cavities and pockets is a typical application in this field, therefore, the tool ramping capabilities have significant meaning. Another important factor for the die and mold industry, namely, machining with a large tool overhang, which decreased static and dynamic stiffness of the clamped tool and affects cutting stability, requires reliable insert clamping in order to prevent premature insert wear and even its breakage.

There are two main design approaches to cutting edges of the tools for high feed milling, particularly for ramping. According to one approach the cutting edge is a portion of a cutter with round inserts of large diameter. According to another approach the cutting edge is a straight line inclined at a small angle. An high feed milling insert is clamped by a clamping screw that passes through the central hole of the insert, but in many cases an additional clamping element, like a clamping arm, is introduced in the tool design in order to reliably fix the insert into the pocket.

An example of a tool for high feed milling is described in U.S. Pat. No. 6,413,023 being directed to a product named HITACHI ASR Alpha Turbo line. The insert has a main cutting edge portion, a peripheral cutting edge portion and an internal straight cutting edge portion. The insert has a positive side inclination, that is, the side surfaces are forming with the upper surface an angle that is less than 90°. The patent figures show that the insert can have two or three cutting edges. The tool comprises two clamping elements. A first clamping element is the insert clamping screw. The second clamping element is the clamping arm.

FIGS. 1 and 2 show an example of a cutting insert with a positive geometry or, as mentioned above, a positive side inclination. FIG. 1 shows a general perspective view of a cutting insert of such a kind. FIG. 2 shows a cross section of the cutting insert of FIG. 1 taken along line II-II in FIG. 1. As clearly seen in FIG. 2, the side surfaces of the cutting insert form with the upper surface an angle that is less than 90°.

A similar approach to insert clamping is observed in DIJET High Feed Diemaster "SKS" Type, MITSUBISHI High-feed radius milling cutter AJX type (Japanese patent applications JP20040268123 20040915, JP20040259472 20040907), KORLOY HRM Tools. The inserts have three cutting edges and side inclination between 13° to 15° that ensures necessary relief for inserts mounted on a tool. As a result of the positive side inclination one of the components F1 of the pocket wall reaction force F tends to push the insert off from the pocket bottom, like shown for example in FIG. 3.

The clamping arm, an important element for rigid clamping and, hence, stable cutting, comprises a number of parts, and thus can cause a certain amount of inconvenience for an operator due to the necessity to use two different wrenches for insert indexing or replacing, namely, one for the clamping screw and the other for the clamping arm. Another disadvantage of using a clamping arm is the increased time necessary for the tool production, since there are more machining and assembling operations.

Furthermore, the clamping arm is an obstacle for free chip flow and experiences additional loading because of chip strikes, especially in pockets machining, when chip evacuation is difficult.

Therefore, some known solutions for HFM inserts with positive side inclination use a clamping screw only. For example, FETTE MultiEdge 3Feed, ISCAR FeedMill (U.S. Pat. No. 6,709,205) or SAFETY PENTA High Feed. FETTE (MultiEdge 3Feed) decreases the side inclination angle to 11°. ISCAR (FeedMill) adds a cylindrical protrusion to the insert bottom and a recess to the pocket base wall accordingly. The protrusion makes the location and clamping of the insert more reliable by the additional abutment surface but limits the number of indexable cutting edges since the cutting insert can not be reversible. All the indexable milling inserts considered above are one-sided.

U.S. Pat. No. 3,289,271 discloses a replaceable indexable cutting insert that is used for turning applications. The cutting insert is provided with a plurality of sides between two parallel faces such that each side has an angle less than 90° with another face. In FIG. 1 there is shown a cutting insert (10) with a generally trigonal shape, wherein the cutting insert utilizes on a given face (12) three cutting edges (40, 44, 48) that their sides (16, 20, 24) have less than 90° with the face (12).

Since the cutting insert (10) has three cutting edges per face, and since it is capable of being turned over to the other face, the cutting insert is provided with a total of six cutting edges. The cutting insert (10) is limited from being used for high speed machining since it is not provided with adequate means for disposing of chips, especially, for external milling together with ramp down milling.

It is the object of the present invention to provide a cutting insert that significantly reduces or overcomes the aforementioned disadvantages.

It is a further object of the present invention to provide a cutting insert that is particularly useful for high speed milling combined with ramp down operations.

It is still a further object of the present invention to provide a cutting insert that is particularly useful for high speed milling combined with ramp down operations that has an increased number of cutting edges.

It is yet a further object of the present invention to provide a tool for clamping such a cutting insert.

SUMMARY OF THE INVENTION

In accordance with the present invention there is provided
 a cutting insert having a polygonal shape, the cutting
  insert comprising:
 two opposing end surfaces and a peripheral surface extending therebetween, with a median plane located between the end surfaces bisecting the cutting insert;
 a through bore extending between the end surfaces;
 a cutting edge formed at the intersection of each end surface with the peripheral surface, the cutting edge being divided into identical cutting sections, each cutting section being located between two vertexes of the polygonal shape, each cutting edge section comprising a primary cutting edge and a secondary cutting edge that merge together;

an insert tangential abutment surface located between the cutting edge and the through bore; wherein a primary relief surface in the peripheral surface extends from each primary cutting edge and forms an insert internal obtuse angle with a first reference plane that passes through the primary cutting edge and is parallel to the median plane;

a secondary relief surface in the peripheral surface extends from each secondary cutting edge and forms an insert internal acute angle with a second reference plane that passes through the secondary cutting edge and is parallel to the median plane; and each primary cutting edge has a first curved shape and each secondary cutting edge has a second curved shape.

According to a specific embodiment of the present invention, the first curved shape is convex in a side view of the cutting insert; and the second curved shape is concave in a side view of the cutting insert.

According to another embodiment of the present invention, the first curved shape is concave in a side view of the cutting insert; and the second curved shape is convex is a side view of the cutting insert.

If desired, the polygonal shape of the cutting insert has three vertexes.

Typically, a vertex angle is obtuse as seen in a top view of the cutting insert.

Advantageously, the two opposing end surfaces are identical.

Further advantageously, the cutting insert is provided with six primary cutting edges and six secondary cutting edges.

According to the present invention there, is provided a cutting tool having a longitudinal axis of rotation and comprising:

a tool body having at least one insert pocket formed in a front end of the tool body and a cutting insert retained in the at least one insert pocket, the at least one insert pocket comprising:

a pocket tangential abutment surface;

a threaded bore extending tangentially rearwardly from the pocket tangential abutment surface;

pocket side walls extending upwardly from the pocket tangential abutment surface, two of the pocket side walls are pocket abutment surfaces that form a pocket internal acute angle with the pocket tangential abutment surface;

the cutting insert has a polygonal shape and comprises:

two opposing end surfaces and a peripheral surface extending therebetween, with a median plane located between the end surfaces bisecting the cutting insert;

a through bore extending between the end surfaces;

a cutting edge formed at the intersection of each end surface with the peripheral surface, the cutting edge being divided into identical cutting sections, each cutting section being located between two vertexes of the polygonal shape, each cutting edge section comprising a primary cutting edge and a secondary cutting edge that merge together;

an insert tangential abutment surface located between the cutting edge and the through bore;

a primary relief surface in the peripheral surface extends from each primary cutting edge and forms an insert internal obtuse angle with a first reference plane that passes through the primary cutting edge and is parallel to the median plane;

a secondary relief surface in the peripheral surface extends from each secondary cutting edge and forms an insert internal acute angle with a second reference plane that passes through the secondary cutting edge and is parallel to the median plane; wherein the insert tangential abutment surface abuts the pocket tangential abutment surface, two primary relief surfaces of the cutting insert abut the two pocket abutment surfaces in a dovetail manner, and a clamping bolt passes through the through bore of the cutting insert and threadingly engages the threaded bore.

Advantageously, the pocket abutment surfaces are separated by a pocket side wall that is not a pocket abutment surface and the secondary relief surface of the cutting insert that is located between the two abutted primary relief surfaces remains unabutted.

If desired, the pocket tangential abutment surface is divided into three pocket tangential abutment regions.

Typically, the pocket abutment surfaces form an acute pocket abutment surfaces angle therebetween as seen in a top view of the insert pocket.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
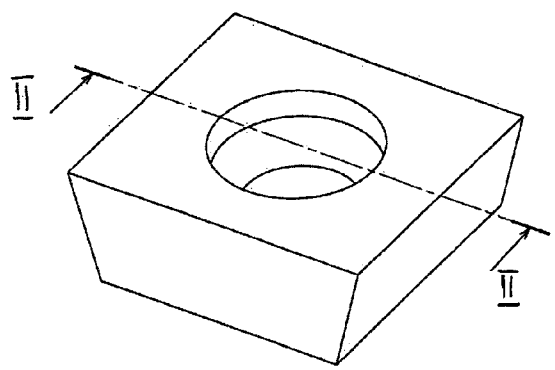
FIG. 1 is a perspective view of a prior art cutting insert having positive side inclination.
Figure 2:
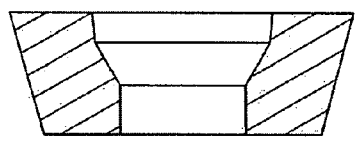
FIG. 2 is a cross-sectional view of the cutting insert of FIG. 1 taken along line II-II in FIG. 1.
Figure 3:
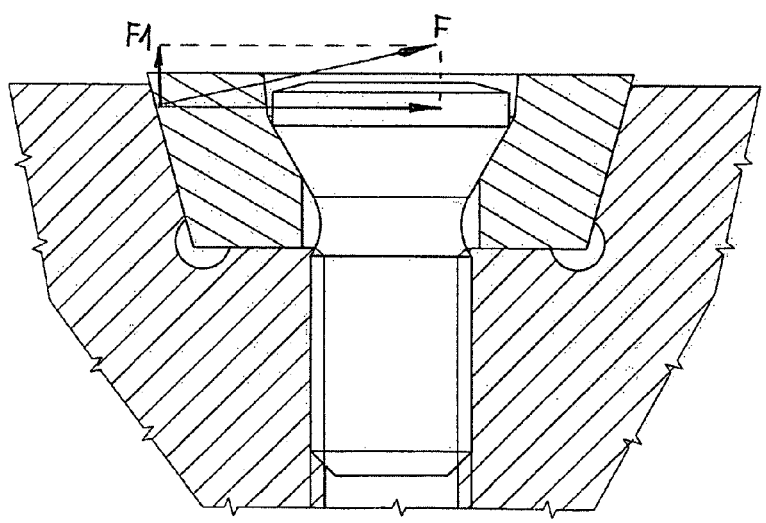
FIG. 3 is a cross-sectional schematical view of a prior art cutting insert having positive side inclination seated within a tool pocket.
Figure 4:
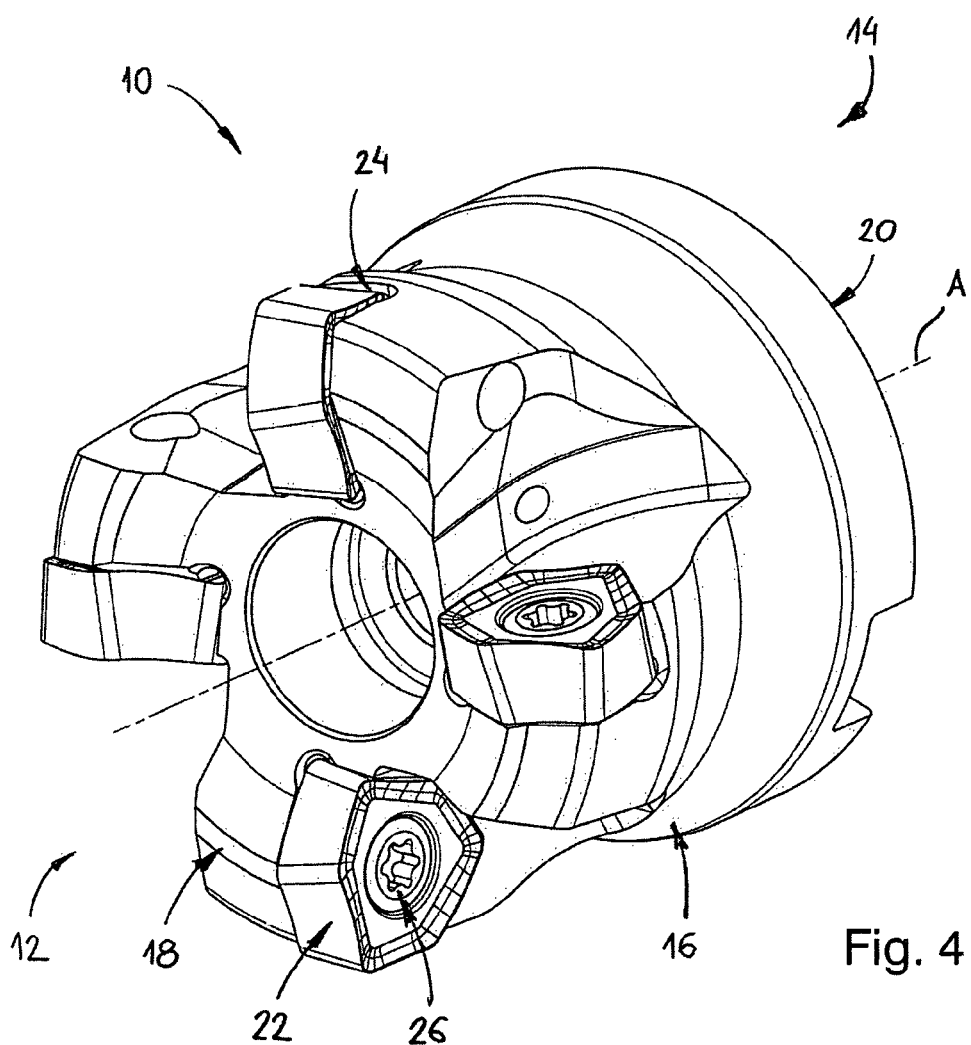
FIG. 4 is a perspective view of a cutting tool in accordance with the present invention.
Figure 5:
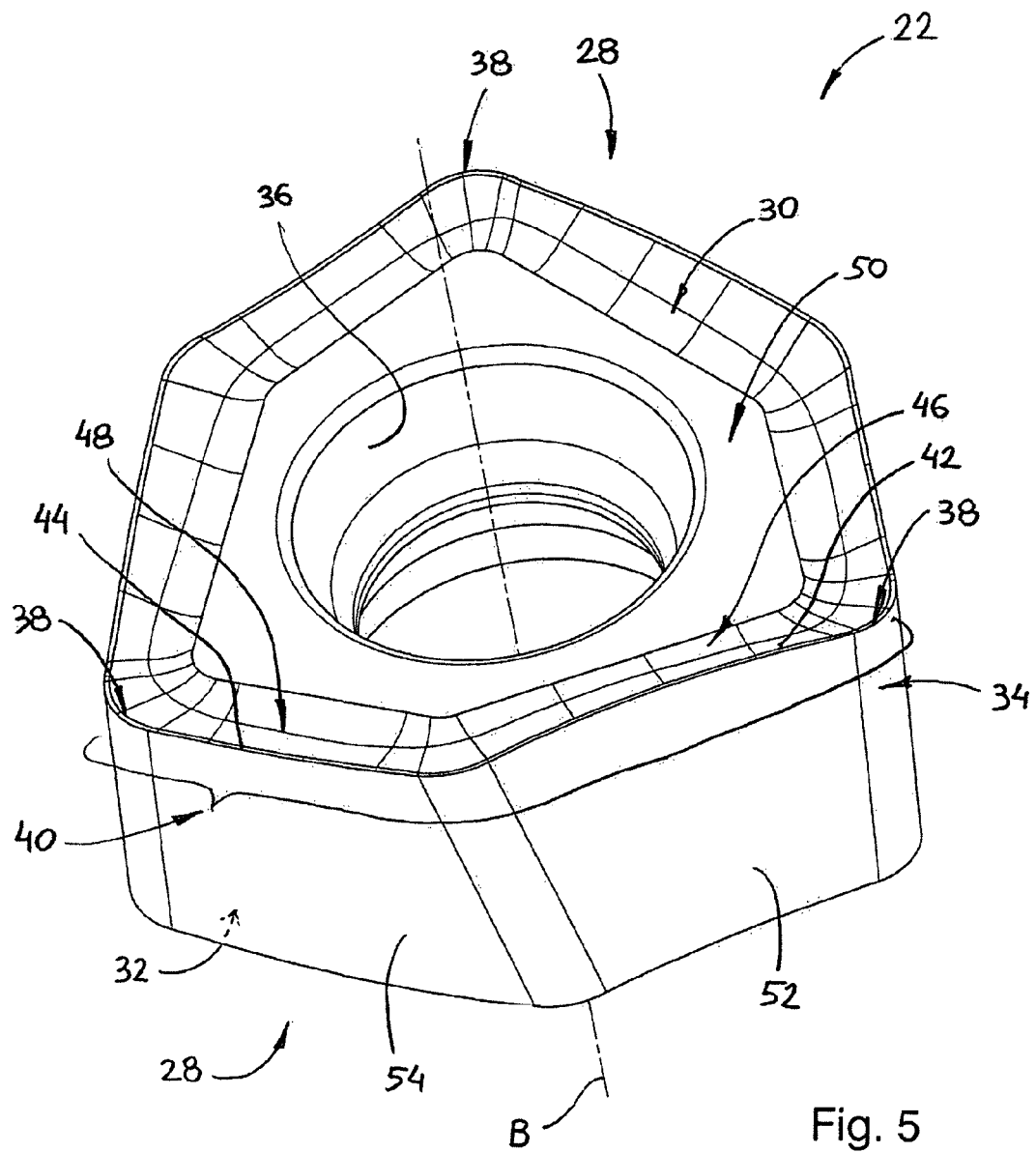
FIG. 5 is a perspective view of a cutting insert in accordance with the present invention.

Attention is first drawn to FIG. 4 showing a cutting tool 10 in accordance with the present invention. The cutting tool 10 has a longitudinal axis of rotation A defining a front end 12 and a rear end 14. The cutting tool 10 comprises a tool body 16 having a front end 18 and a rear end 20. The tool body 16 has a plurality of cutting inserts 22 mounted therein. Each of the cutting inserts 22 is seated within an insert pocket 24 and retained by a clamping bolt 26.

Attention is now drawn to FIGS. 5 to 9. The cutting insert 18 has a generally trigonal shape and comprises two opposing identical end surfaces 28, namely, an upper surface 30 and a lower surface 32. A peripheral surface 34 extends between the two end surfaces 28. A through bore 36 having a bore axis B extends between the two end surfaces 28. Since the two end surfaces 28 are identical, only one of them will be described.

The intersection between the upper surface 30 and the peripheral surface 34 forms cutting edges. The cutting edges between each two vertexes 38 of the trigon are divided into three identical cutting sections 40. Each cutting section 40 comprises a primary cutting edge 42 that merges with a secondary cutting edge 44. Thus, on a given side of the cutting insert 22, it comprises three primary cutting edges 42 and three secondary cutting edges 44 that give a total of six cutting edges per side. Therefore, in total, the cutting insert 22 is provided with twelve cutting edges, which provides a considerable advantage compared to known cutting inserts for similar use but with less cutting edges.

Figure 7:
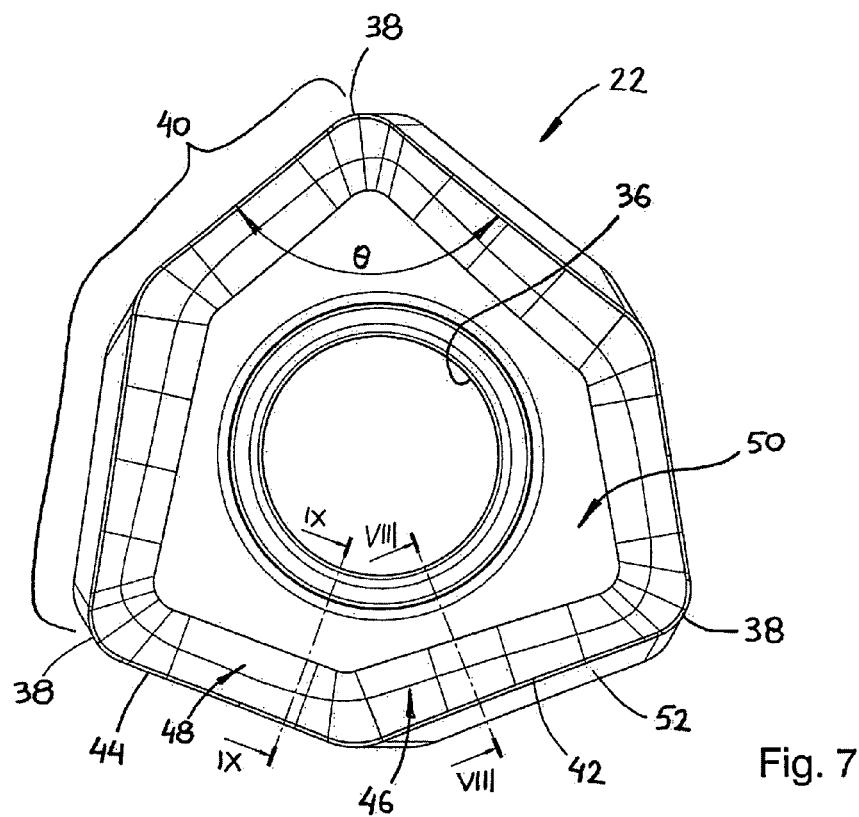
FIG. 7 is a top view of the cutting insert of FIG. 4.

As is best seen in FIG. 7, each of the vertexes 38 has an obtuse internal vertex angle θ. According to a specific embodiment of the present invention, the internal vertex angle θ is 102.5°.

A primary rake surface 46 extends inwardly from each of the primary cutting edges 42. Similarly, a secondary rake surface 48 extends inwardly from each of the secondary cutting edges 44. All the primary rake surfaces 46 and the secondary rake surfaces 48 merge with a central insert tangential abutment surface 50.

Figure 6:
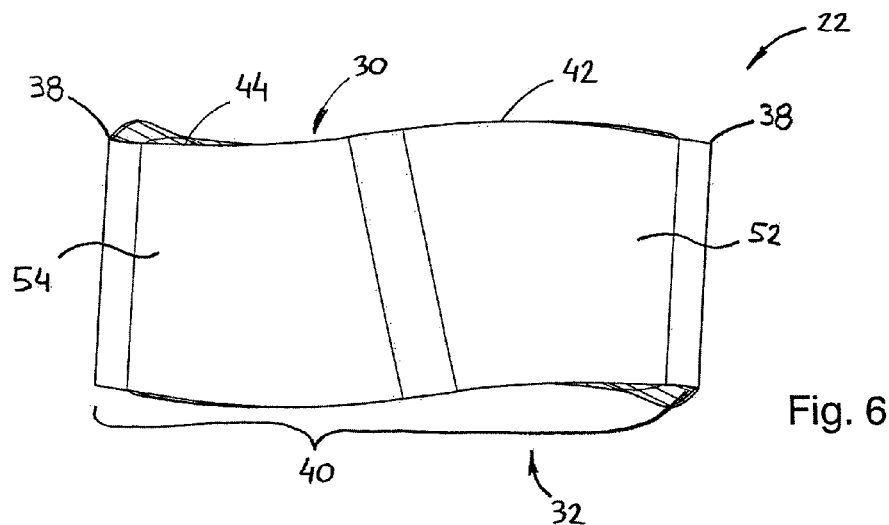
FIG. 6 is a side view of the cutting insert of FIG. 4.

As best seen in FIG. 6, each of the primary cutting edges 42 is convex and each of the secondary cutting edges 44 is concave in a side view of the cutting insert 22. When the cutting insert 22 is retained within an insert pocket 24 and the cutting tool 10 performs a face milling operation combined with a ramp down operation, the active primary cutting edge 42 performs the face milling operation and the active secondary cutting edge 44 performs the ramp down milling operation.

The convexity of the primary cutting edge 42 contributes to strengthening of the primary cutting edge 42 and increasing its wedge angle. This is advantageous during machining since the primary cutting edge 42 is subjected to the major portion of cutting forces applied on the cutting insert 22 during machining.

The concavity of the secondary cutting edge 44 contributes to better chip removal from the secondary cutting edge 44 towards the periphery 68 of the tool body 16 (see FIG. 10), and, to decreasing the wedge angle of the secondary cutting edge 44, an advantage when performing ramp down milling operations.

Each of the primary cutting edges 42 is associated with a primary relief surface 52 formed on the peripheral surface 34 of the cutting insert 22. Similarly, each of the secondary cutting edges 44 is associated with a secondary relief surface 54 formed on the peripheral surface 34 of the cutting insert 22.

Figure 8:
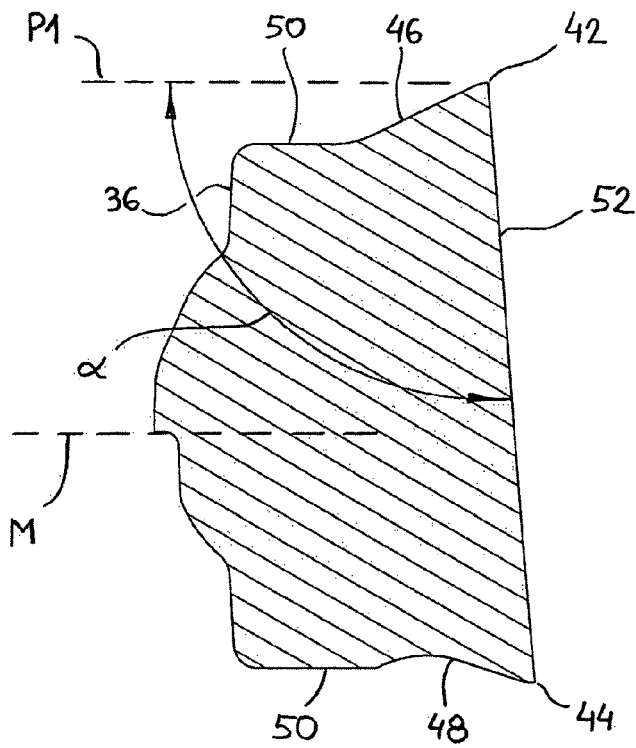
FIG. 8 is a cross-sectional view of the cutting insert taken along line VIII-VIII in FIG. 7.

As shown in FIG. 8, each of the primary relief surfaces 52 forms an insert internal obtuse angle α with a first reference plane P1 that passes through the primary cutting edge 42 and is parallel to a median plane M of the cutting insert 22.

Figure 9:
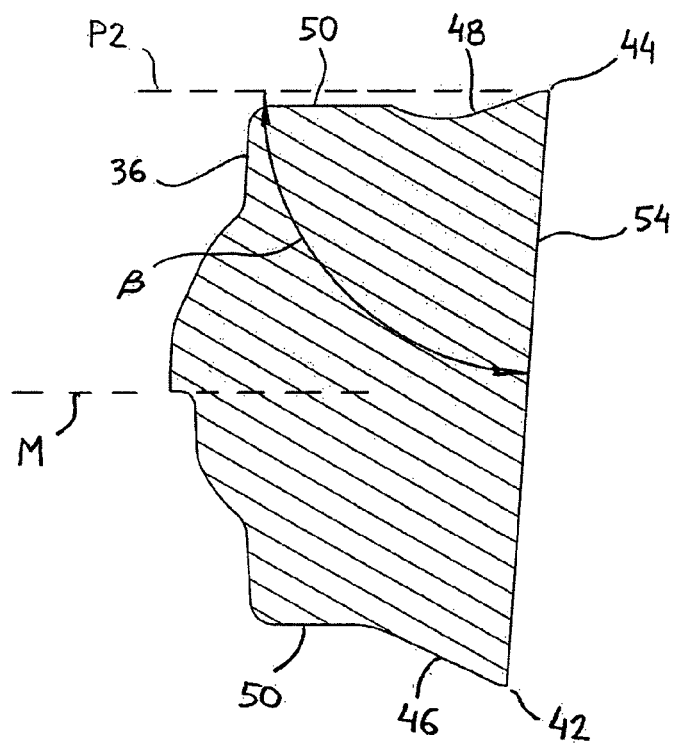
FIG. 9 is a cross-sectional view of the cutting insert taken along line IX-IX in FIG. 7.

As shown in FIG. 9, each of the secondary relief surfaces 54 forms an insert internal acute angle β with a second reference plane P2 that passes through the secondary cutting edge 44 and is parallel to the median plane M.

Figure 10:
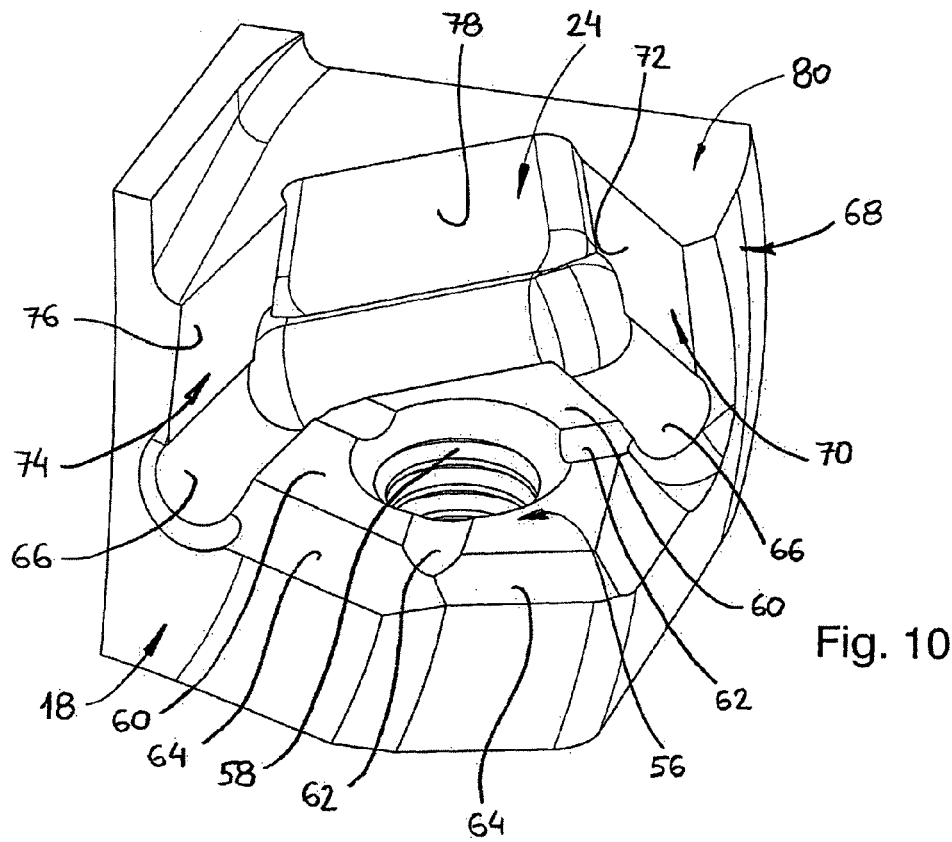
FIG. 10 is a perspective view of an insert pocket of the tool body shown in FIG. 4.
Figure 11:
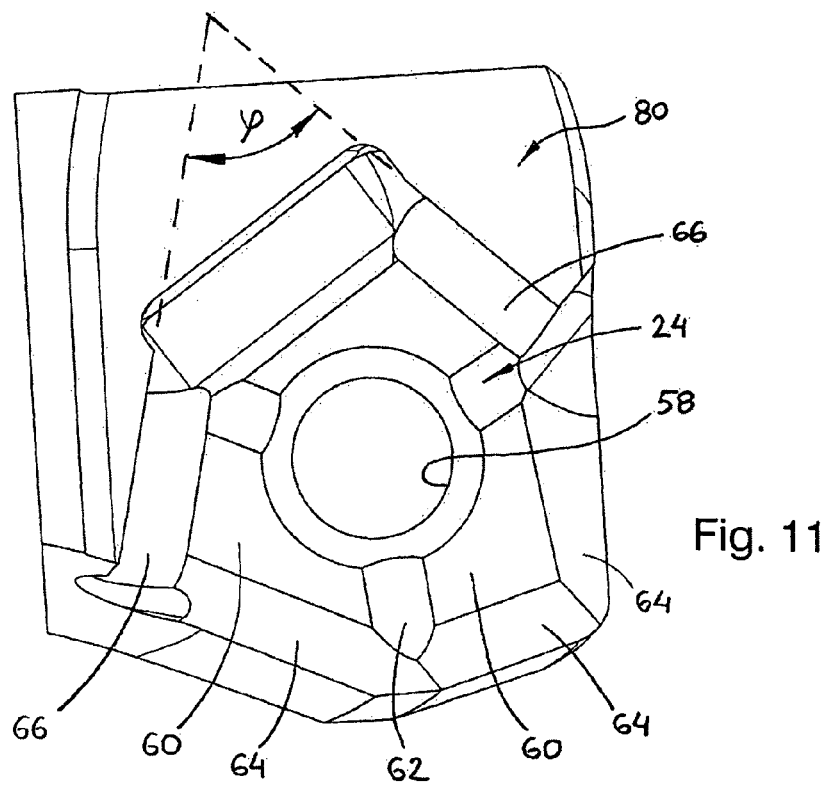
FIG. 11 is a top view of the pocket of FIG. 10.

Attention is now drawn to FIGS. 10 and 11. As shown, the insert pocket 24 has a pocket tangential abutment surface 56. A threaded bore 58 extends tangentially rearwardly from the pocket tangential abutment surface 56. The pocket tangential abutment surface 56 may be divided into three pocket tangential abutment regions 60 by means of slots 62.

An outer end of the pocket tangential abutment surface 56 terminates in chamfered clearance surfaces 64. An inner end of the pocket tangential abutment surface 56 terminates in clearance grooves 66.

Figure 13:
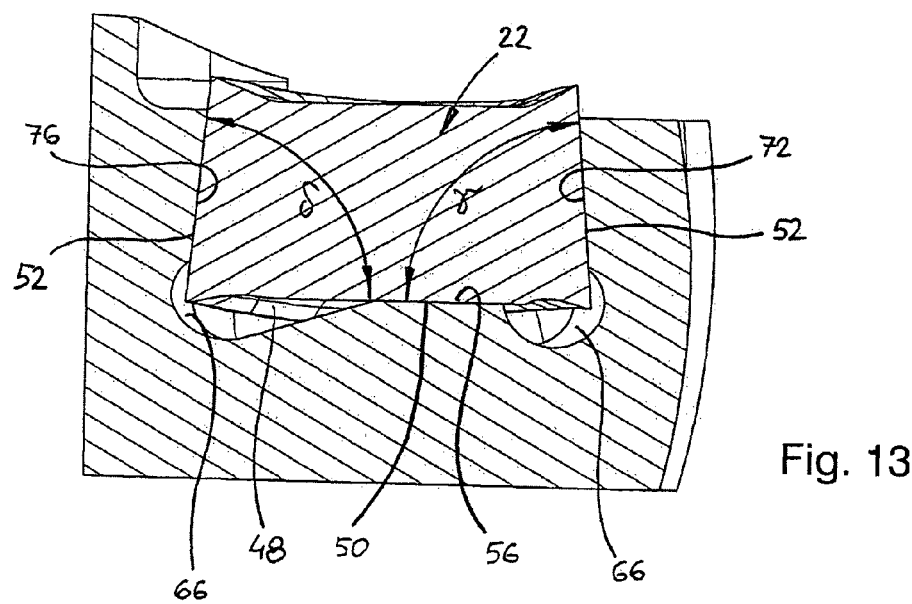
FIG. 13 is a cross-sectional view of the cutting insert and the insert pocket taken along line XIII-XIII in FIG. 12.

A first pocket side wall 70, adjacent a periphery 68 of the tool body 16, extends upwardly from the clearance groove 66. The first pocket side wall 70 constitutes a first pocket abutment surface 72. As shown in FIG. 13, the first pocket abutment surface 72 forms a first pocket internal acute angle γ with the pocket tangential abutment surface 56.

A second pocket side wall 74, adjacent the front end 18 of the tool body 16 and spaced apart from the first pocket side wall 70, extends upwardly from the clearance groove 66. The second pocket side wall 74 constitutes a second pocket abutment surface 76. As shown in FIG. 13 the second pocket abutment surface 76 forms a second pocket internal acute angle δ with the pocket tangential abutment surface 56. In accordance with some embodiments, the first pocket internal acute angle γ may be equal to the second pocket internal acute angle δ. The first pocket internal acute angle γ and the second pocket internal acute angle δ may be complementary to the insert internal obtuse angle α or slightly larger.

A third pocket side wall 78, located between the first pocket side wall 70 and the second pocket side wall 74, extends upwardly from the clearance groove 66. The third pocket side wall 78 does not constitute a pocket abutment surface. When the cutting insert 22 is retained in the insert pocket 24, there is a clearance between secondary relief surface 54 of the cutting insert 22 and the third pocket side wall 78.

As best seen in FIG. 11, the first pocket abutment surface 72 and the second pocket abutment surface 76 form an acute pocket abutment surfaces angle φ therebetween. According to a specific embodiment of the present invention, the pocket abutment surfaces angle φ is 60°.

Figure 12:
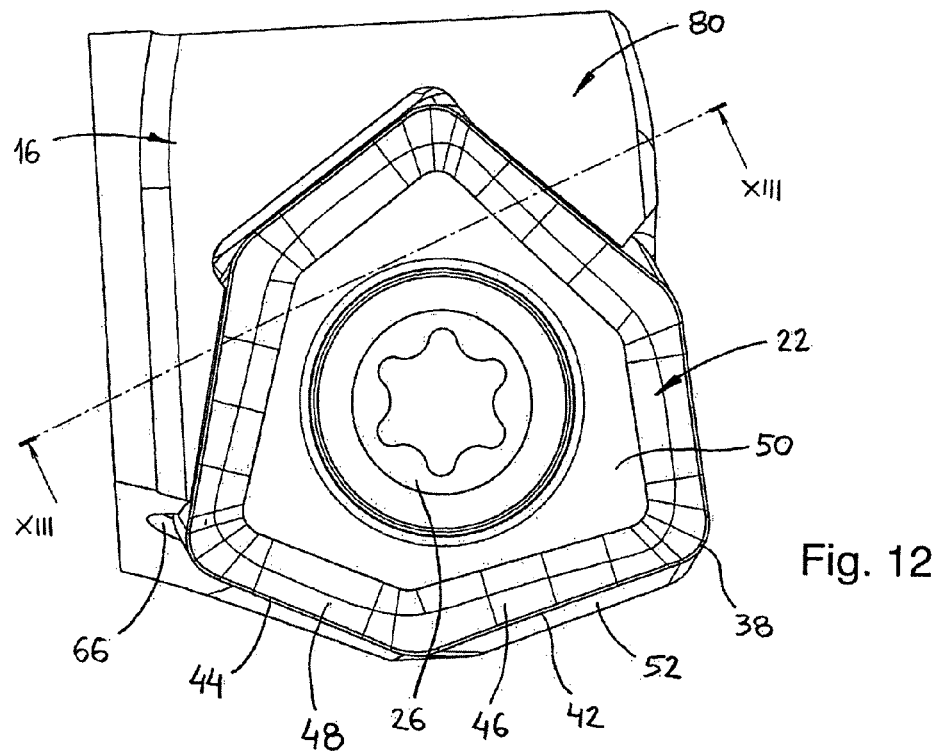
FIG. 12 is a top view of the cutting insert of FIG. 4 retained in the insert pocket of FIG. 10.

The cutting insert 22 is seated in the insert pocket 24, as shown in FIGS. 12 and 13, in the following manner. The insert tangential abutment surface 50 abuts the pocket tangential abutment surface 56. A first primary relief surface 52 of the cutting insert 22 abuts the first pocket abutment surface 72. A second primary relief surface 52 of the cutting insert 22 abuts the second pocket abutment surface 76.

As mentioned above, the secondary relief surface 54 of the cutting insert 22 that is located between the two abutted primary relief surfaces 52 remains unabutted due to the clearance provided by the third pocket side wall 78. The primary cutting edges 42 with their associated primary rake surface 46 and the secondary cutting edges 44 with their associated secondary rake surface 48, which are associated with the abutted insert tangential abutment surface 50, remain free and unabutted due to the chamfered clearance surfaces 64 and the clearance grooves 66. A chip gullet 80 extends axially rearwardly from the insert pocket 24 to enable free flow of the chips produced during machining.

The tightening and retaining of the cutting insert 22 is provided by the clamping bolt 26 that passes through the through bore 36 of the cutting insert 22 and threadingly engages the threaded bore 58 in the insert pocket 24. As seen in FIG. 13, by way of the above described construction, the cutting insert 22 is retained within the insert pocket 24 in a dovetail manner, thus providing several advantages. This construction increases the rigidity of the clamping of the cutting insert 22, decreases the stresses applied on the clamping bolt 26 during machining, increases the clamping bolt's tool life, decreases vibrations, improves surface quality of a machined workpiece and increases the cutting insert's tool life.

The cutting tool 10 may be advantageously used also for performing side plunging operations. During side plunging machining, when compared to previous cutting tools, the cutting tool 10 has less power consumption, less torque consumption, and the chips produced are smoother and flatter.

Although the present invention has been described to a certain degree of particularity, it should be understood that various alterations and modifications could be made without departing from the spirit or scope of the invention as hereinafter claimed.

For example, according to a specific embodiment of the present invention, the primary cutting edge is convex and the secondary cutting edge is concave. However, according to other embodiments of the invention, the primary cutting edge may be concave and the secondary cutting edge may be convex.

The cutting insert does not have to have three vertexes only and it may be provided with a larger number of vertexes like, for example, four, five or six.

The trigonal shape does not have to be generally symmetrical with the length of the primary cutting edge with respect to the associated secondary edge. Thus, for example, a primary cutting edge may be much larger or much smaller than the associated secondary cutting edge.

The invention claimed is:

1. A cutting insert (22) having a polygonal shape, the cutting insert (22) comprising:
   two opposing end surfaces (28) and a peripheral surface (34) extending therebetween, with a median plane (M) located between the end surfaces (28) bisecting the cutting insert (22);
   a through bore (36) extending between the end surfaces (28);
   a cutting edge formed at the intersection of each end surface (28) with the peripheral surface (34), the cutting edge being divided into identical cutting sections (40), each cutting section being located between two vertexes (38) of the polygonal shape, each cutting edge section comprising a primary cutting edge (42) and a secondary cutting edge (44) that merge together;
   an insert tangential abutment surface (50) located between the cutting edge and the through bore (36); wherein
   a primary relief surface (52) in the peripheral surface extends from each primary cutting edge and forms an insert internal obtuse angle ($\alpha$) with a first reference plane (P1) that passes through the primary cutting edge and is parallel to the median plane (M);
   a secondary relief surface (54) in the peripheral surface extends from each secondary cutting edge and forms an insert internal acute angle ($\beta$) with a second reference plane (P2) that passes through the secondary cutting edge and is parallel to the median plane (M); and
   each primary cutting edge has a first curved shape and each secondary cutting edge has a second curved shape, in a side view of the cutting insert.

2. The cutting insert (22) according to claim 1, wherein
   the first curved shape is convex in a side view of the cutting insert; and
   the second curved shape is concave in a side view of the cutting insert.

3. The cutting insert (22) according to claim 1, wherein
   the first curved shape is concave in a side view of the cutting insert; and
   the second curved shape is convex is a side view of the cutting insert.

4. The cutting insert (22) according to claim 1, wherein the polygonal shape of the cutting insert has three vertexes (38).

5. The cutting insert (22) according to claim 4, wherein a vertex angle ($\theta$) is obtuse as seen in a top view of the cutting insert.

6. The cutting insert (22) according to claim 1, wherein the two opposing end surfaces (28) are identical.

7. The cutting insert (22) according to claim 1, wherein the cutting insert is provided with six primary cutting edges (42) and six secondary cutting edges (44).

8. A cutting tool (10) having a longitudinal axis of rotation (A) and comprising:
   a tool body (16) having at least one insert pocket (24) formed in a front end (18) of the tool body and a cutting insert (22) retained in the at least one insert pocket, the at least one insert pocket (24) comprising:
   a pocket tangential abutment surface (56);
   a threaded bore (58) extending tangentially rearwardly from the pocket tangential abutment surface;
   pocket side walls (70, 74, 78) extending upwardly from the pocket tangential abutment surface (56), two of the pocket side walls are pocket abutment surfaces (72, 76) that form a pocket internal acute angle ($\gamma$, $\delta$) with the pocket tangential abutment surface;
   the cutting insert (22) has a polygonal shape and comprises:
   two opposing end surfaces (28) and a peripheral surface (34) extending therebetween, with a median plane (M) located between the end surfaces (28) bisecting the cutting insert (22);
   a through bore (36) extending between the end surfaces;
   a cutting edge formed at the intersection of each end surface (28) with the peripheral surface (34), the cutting edge being divided into identical cutting sections (40), each cutting section being located between two vertexes (38) of the polygonal shape, each cutting edge section comprising a primary cutting edge (42) and a secondary cutting edge (44) that merge together;
   an insert tangential abutment surface located between the cutting edge and the through bore;
   a primary relief surface (52) in the peripheral surface extends from each primary cutting edge (42) and forms an insert internal obtuse angle ($\alpha$) with a first reference plane (P1) that passes through the primary cutting edge and is parallel to the median plane (M);
   a secondary relief surface (54) in the peripheral surface extends from each secondary cutting edge (44) and forms an insert internal acute angle ($\beta$) with a second reference plane (P2) that passes through the secondary cutting edge and is parallel to the median plane (M);
   wherein
   the insert tangential abutment surface (50) abuts the pocket tangential abutment surface (56),
   two primary relief surfaces (52) of the cutting insert abut the two pocket abutment surfaces (72, 76) in a dovetail manner, and
   a clamping bolt (26) passes through the through bore (36) of the cutting insert and threadingly engages the threaded bore (58).

9. The cutting tool (10) according to claim 8, wherein the pocket abutment surfaces (72, 76) are separated by a pocket side wall (78) that is not a pocket abutment surface and the secondary relief surface (54) of the cutting insert that is located between the two abutted primary relief surfaces (52) remains unabutted.

10. The cutting tool (10) according to claim 8, wherein the pocket tangential abutment surface (56) is divided into three pocket tangential abutment regions (60).

11. The cutting tool (10) according to claim 8, wherein the pocket abutment surfaces (72, 76) form an acute pocket abutment surfaces angle ($\phi$) therebetween as seen in a top view of the insert pocket.

12. A cutting insert (22) having a trigonal shape, the cutting insert (22) comprising:
- two opposing identical end surfaces (28) and a peripheral surface (34) extending therebetween, with a median plane (M) located between the end surfaces (28) bisecting the cutting insert (22);
- a through bore (36) extending between the end surfaces (28);
- a cutting edge formed at the intersection of each end surface (28) with the peripheral surface (34), the cutting edge being divided into three identical cutting sections (40), each cutting section being located between two vertexes (38) of the trigonal shape, each cutting edge section comprising a primary cutting edge (42) and a secondary cutting edge (44) that merge together;
- an insert tangential abutment surface (50) located between the cutting edge and the through bore (36); wherein
- a primary relief surface (52) in the peripheral surface extends from each primary cutting edge and forms an insert internal obtuse angle ($\alpha$) with a first reference plane (P1) that passes through the primary cutting edge and is parallel to the median plane (M);
- a secondary relief surface (54) in the peripheral surface extends from each secondary cutting edge and forms an insert internal acute angle ($\beta$) with a second reference plane (P2) that passes through the secondary cutting edge and is parallel to the median plane (M); and
- each primary cutting edge is convex in a side view of the cutting insert and each secondary cutting edge is concave in a side view of the cutting insert.

* * * * *